(12) United States Patent
Chen

(10) Patent No.: US 6,324,954 B1
(45) Date of Patent: Dec. 4, 2001

(54) DEVICE FOR ACTUATING A PUNCH

(76) Inventor: Cheng Nan Chen, 6F, No. 440-2, Gin Pin Road, Chong Ho City, Taipei Hsien (TW), 235

( * ) Notice: Subject to any disclaimer, the term of this patent is extended or adjusted under 35 U.S.C. 154(b) by 0 days.

(21) Appl. No.: 09/392,541

(22) Filed: Sep. 9, 1999

(51) Int. Cl.[7] ...................................................... B26D 5/08
(52) U.S. Cl. .............................................. 83/633; 83/588
(58) Field of Search ............................ 83/588, 613, 624, 83/625, 626, 627, 633

(56) References Cited

U.S. PATENT DOCUMENTS

| | | | |
|---|---|---|---|
| 277,452 | * 5/1883 | Brandt | 83/633 |
| 1,491,464 | * 4/1924 | Coomer | 83/633 |
| 4,092,005 | * 5/1978 | Benroth | 83/633 |
| 5,142,973 | * 9/1992 | Tur et al. | 83/588 |
| 5,873,294 | * 2/1999 | Sciuto | 83/633 |

* cited by examiner

*Primary Examiner*—W Donald Bray

(57) ABSTRACT

A device for actuating a punch includes a base for supporting the punch and an arm adjustably secured on the base. A barrel is secured to the arm for slidably receiving a shaft, and a lever is pivotally secured to the barrel and coupled to the shaft for moving the shaft to actuate on the punch with an increased torque. A spring is engaged with the shaft for biasing the shaft away from the punch. A seat is secured on the base and includes a bore for slidably receiving the lower portion of the arm. A latch may adjustably secure the arm to the seat according to the size of the punch.

7 Claims, 4 Drawing Sheets

DEVICE FOR ACTUATING A PUNCH

BACKGROUND OF THE INVENTION

1. Field of the Invention

The present invention relates to an actuating device, and more particularly to a device for actuating the typical punches.

2. Description of the Prior Art

Typical punches comprise a punch rod slidably received in a housing, a knob secured on top of the punch rod for forcing the punch rod downward to cut or to punch the sheet members. A spring is engaged with the punch rod for biasing the punch rod away from the sheet members before the punch rod is depressed against the sheet members. The users may not apply a great force to actuate the punches.

The present invention has arisen to mitigate and/or obviate the afore-described disadvantages of the conventional punches.

SUMMARY OF THE INVENTION

The primary objective of the present invention is to provide a device for actuating the punches with an increased force.

In accordance with one aspect of the invention, there is provided a device for actuating a punch, the punch including a housing, a punch rod slidably received in the housing, the device comprising a base for supporting the punch, an arm including a first end having a barrel secured thereon, the arm including a second end for securing to the base, a shaft slidably received in the barrel, and means for moving the shaft downward to actuate on the punch rod of the punch.

The shaft includes a middle portion, the moving means includes a lever having a first end pivotally secured to the barrel at a pivot axle and having a middle portion, and a pin engaged through the middle portions of the lever and of the shaft for allowing the lever to move the shaft to actuate on the punch. The barrel includes an oblong hole formed therein for slidably receiving the pin and for allowing the pin to be moved up and down relative to the barrel. A spring biasing device is further provided for biasing the shaft away from the base and the punch or for recovering the shaft.

An adjusting device is further provided for adjusting the second end of the arm relative to the base. The adjusting means includes a seat secured on the base, the seat includes a bore formed therein for slidably receiving the second end of the arm, and means for latching the second end of the arm to the seat. The seat includes at least one aperture laterally formed therein and communicating with the bore of the seat, the second end of the arm includes at least one orifice formed therein and aligned with the aperture of the seat, the latching means includes a latch engaged through the orifice of the second end of the arm and the aperture of the seat for securing the arm to the seat. A magnetic plate may further be secured on the base for attracting and securing the punch on the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
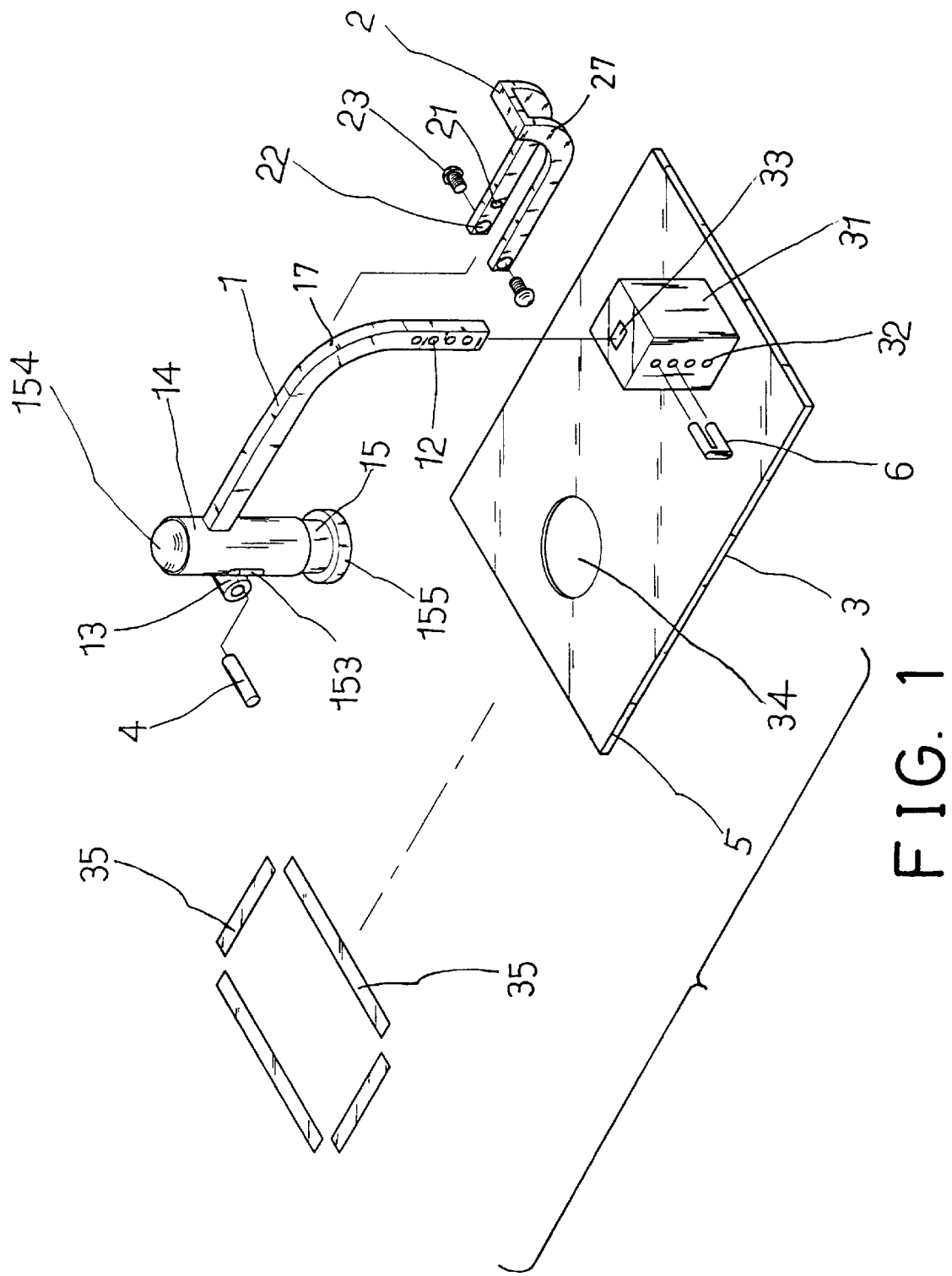
FIG. 1 is a partial exploded view of a device for actuating a punch in accordance with the present invention.
Figure 2:
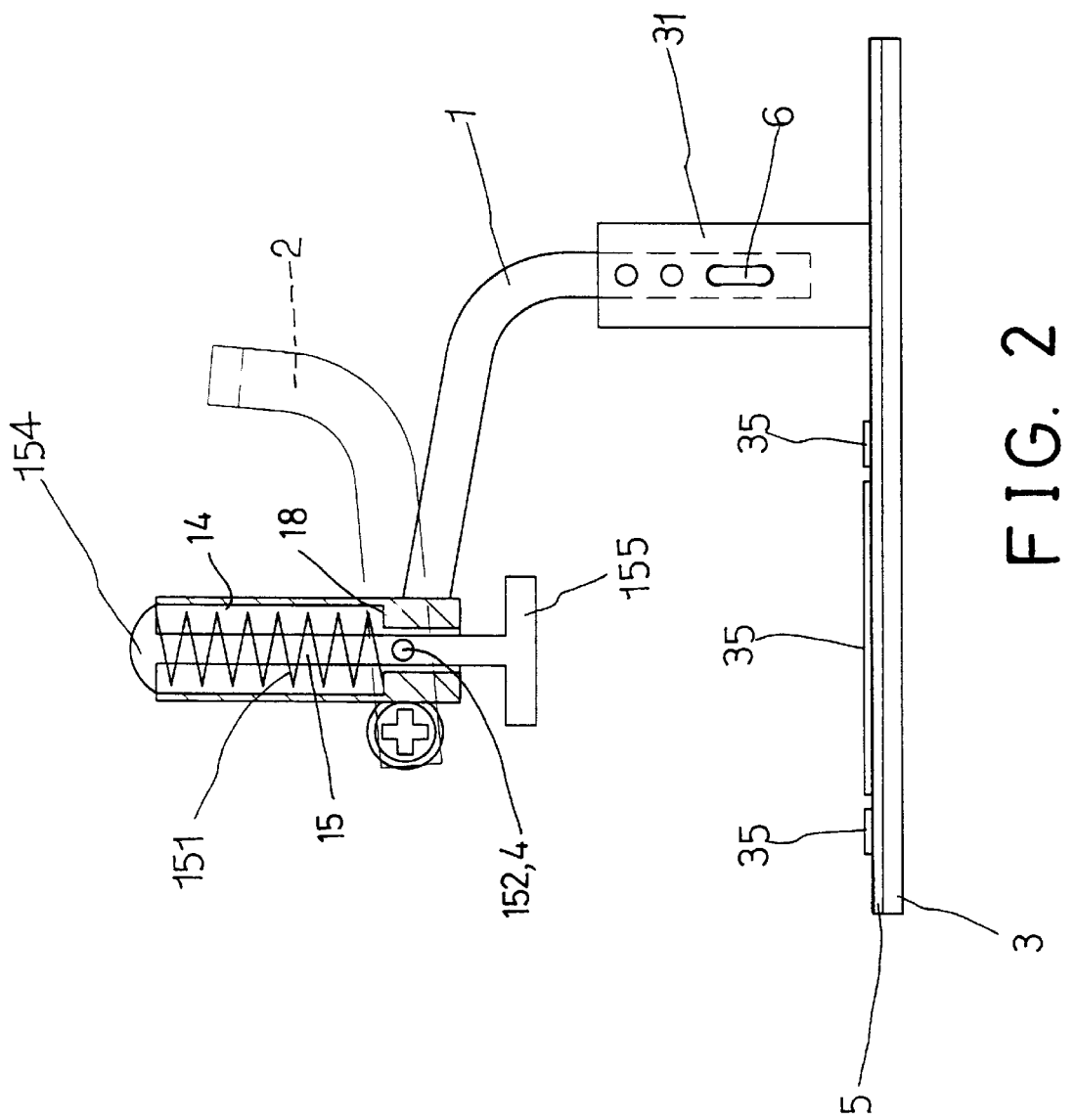
FIG. 2 is a partial cross sectional view of the punch actuating device.
Figure 3:
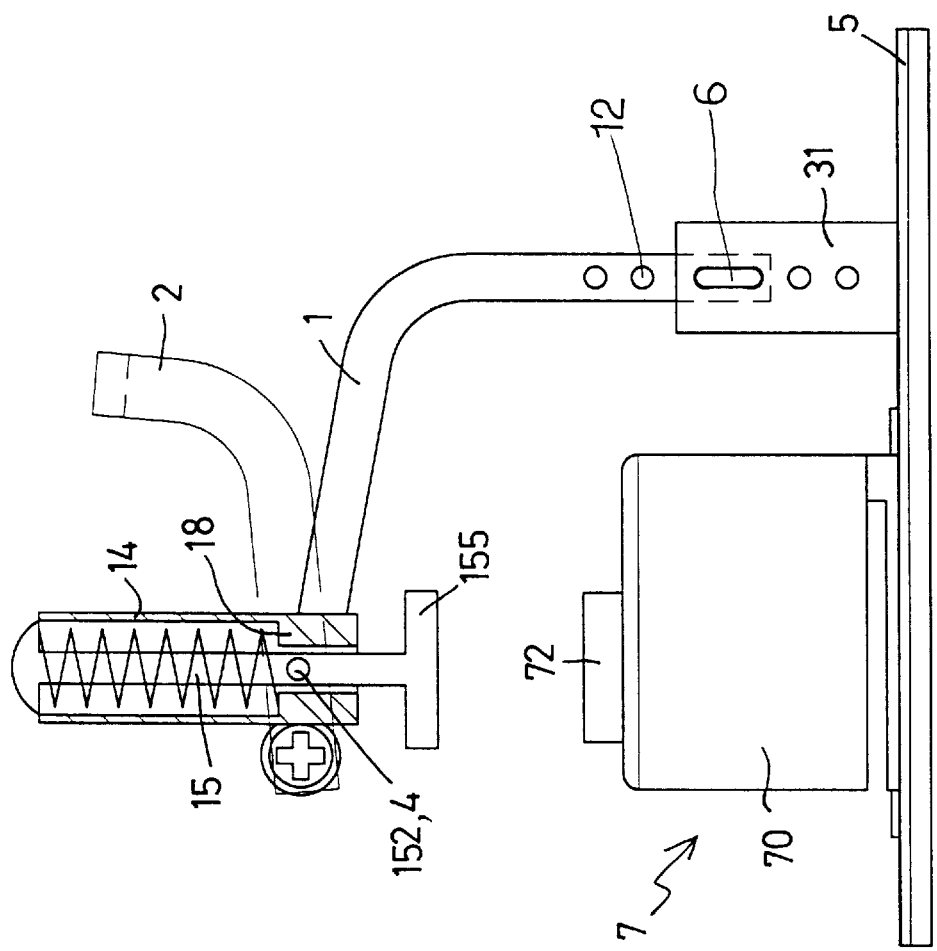
FIG. 3 is a partial cross sectional view similar to FIG. 2, in which a typical punch has been disposed in the position to be actuated by the punch actuating device.

Referring to the drawings, and initially to FIGS. 1–3, a punch actuating device in accordance with the present invention comprises a plate 5 of magnetic materials or of magnetizable materials for attracting and securing the punch 7 on the plate 5. The plate 5 may also made of metal or the like, and the punch 7 may include a magnetic member engaged therein for allowing the punch 7 to be secured onto the plate 5 with the magnetic member that is engaged in the punch 7. A base 3 is secured to the bottom of the plate 5 and preferably made of soft material for engaging with the supporting surface and for preventing the supporting surface from being damaged by the punch actuating device. The plate 5 and the base 3 include an opening 34 formed therein for allowing the punched material to be moved out of the base 3. Alternatively, without the plate 5, the base 3 itself may be made of magnetic materials or of magnetizable materials for attracting and securing the punch 7 thereon. One or more magnetic members 35 may further be disposed or attracted on the plate 5 for securing the punch 7 on the plate 5.

The plate 5 or the base 3 includes a seat 31 secured thereon and preferably disposed opposite to the opening 34 of the base 3. The seat 31 includes a bore 33 formed therein and includes one or more lateral apertures 32 formed therein and communicating or intersecting with the bore 33 of the seat 31 for receiving a latch 6. An arm 1 includes a lower portion for engaging into the bore 33 of the seat 31 and having one or more orifices 12 for receiving the latch 6 and for allowing the arm 1 to be adjustably secured to the seat 31 and for allowing the arm 1 to be adjusted upward and downward relative to the seat 31, according to the sizes of the punches 7. It is preferable that the arm 1 includes a bent portion 17 formed in the middle portion thereof.

Figure 4:
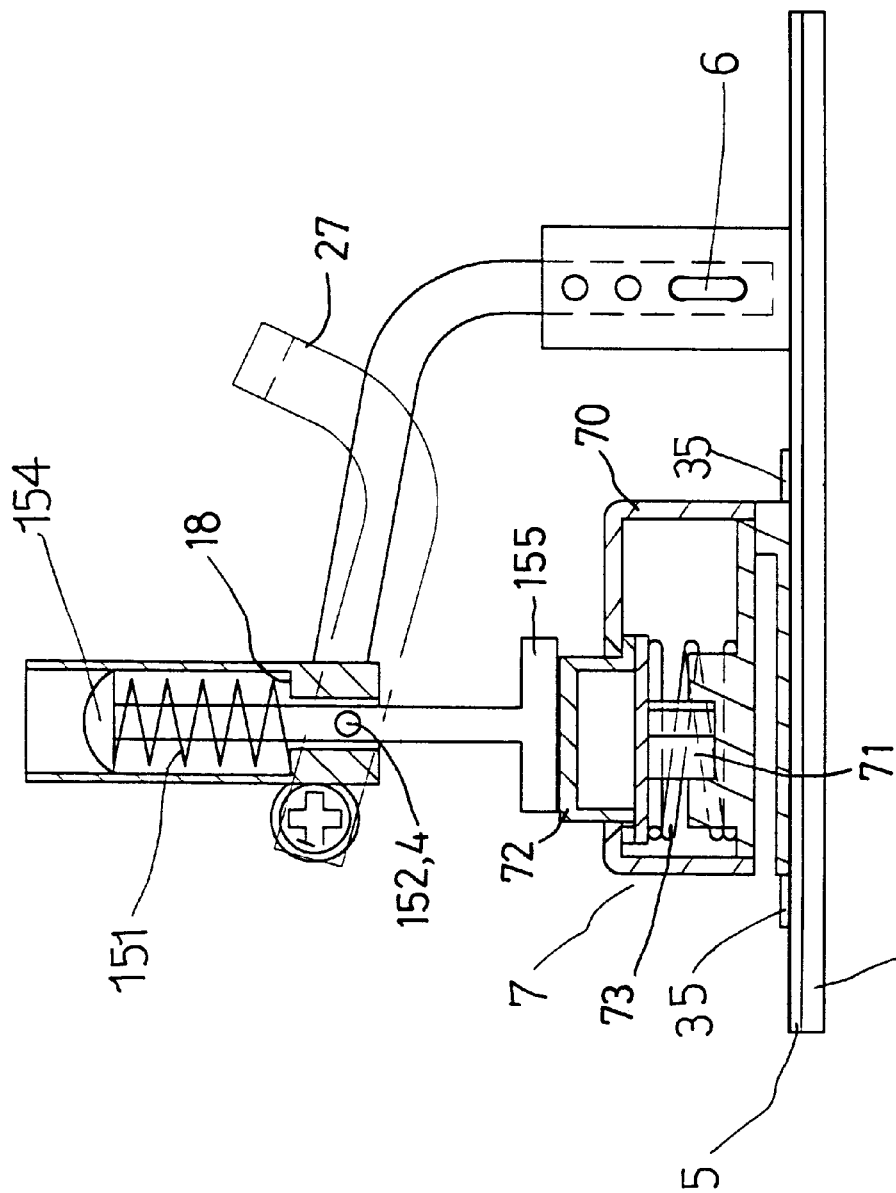
FIG. 4 is a cross sectional view illustrating the actuation of the device to the typical punch.

A barrel 14 is secured to the upper end of the arm 1 for receiving a shaft 15 and a spring 151 therein and includes a peripheral shoulder 18 formed therein for engaging with the spring 151 and for retaining the spring 151 in the barrel 14. The shaft 15 includes a head 154 provided on top thereof and engaged with the spring 151 such that the spring 151 may bias the shaft 15 upward relative to the barrel 14. The shaft 15 includes a disc 155 provided on the bottom thereof and extended downward and outward of the barrel 14 for engaging with the knob 72 of the punch 7 (FIGS. 3, 4). The barrel 14 includes one or a pair of oblong holes 153 (FIG. 1) formed therein for slidably receiving a pin 4 which is engaged through a middle hole 152 of the shaft 15 (FIGS. 2–4), such that the pin 4 moves up and down in concert with the shaft 15. A lever 2 includes one end 22 pivotally secured to the hub 13 of the barrel 14 at a pivot axle that is formed by the fasteners 23 and includes one or more holes 21 formed in the middle portion thereof for receiving the end portions of the pin 4 such that the lever 2 may move the shaft 15 downward against the spring 151 to actuate on the punch 7.

As shown in FIGS. 3 and 4, the typical punch 7 includes a punch rod 71 slidably received in a housing 70, a knob 72 secured on top of the punch rod 71, and a spring 73 is engaged with the punch rod 71 and/or the knob 72 for biasing the knob 72 upward of the housing 70, and for allowing the knob 72 and the punch rod 71 to be depressed inward of the housing 70 against the spring 73 by the disc 155 of the shaft 15 when the shaft 15 is moved downward by the lever 2. The lever 2 includes a handle 27 formed on the other end opposite to the pivot axle 23. The distance between the handle 27 and the pin 4 is greater than that between the pin 4 and the pivot axle 23, such that the moving distance or the moving stroke of the pin 4 is limited, and such that the handle 27 may apply a great torque to the shaft 15 via the pin 4.

In operation, as shown in FIGS. 3 and 4, the disc 155 of the shaft 15 may be moved downward to engage with and to actuate the punch 7 by depressing the handle 27 of the lever 2 against the spring 151. The lever 2 may apply a great torque against the punch 7 such that the punch 7 may be actuate to cut the thicker sheet members. The shaft 15 and the arm 1 may be adjusted upward and downward according to the sizes of the various punches 7 by adjusting the arm 1 relative to the seat 31.

Accordingly, the device in accordance with the present invention may be used for actuating the punches with an increased force and for allowing the punches to cut the thicker sheet members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for actuating a punch, the punch including a housing, a punch rod slidably received in the housing, said device comprising:

a base for supporting the punch, an arm including a first end having a barrel secured thereon. said arm including a second end for securing to said base, a shaft slidably received in said barrel, said shaft including a middle portion, and means for moving said shaft downward to actuate on the punch rod of the punch, said moving means including a lever having a first end pivotally secured to said barrel at a pivot axle and having a middle portion, and a pin engaged through said middle portions of said lever and of said shaft for allowing said lever to move said shaft to actuate on the punch.

2. The device according to claim 1, wherein said barrel includes an oblong hole formed therein for slidably receiving said pin and for allowing said pin to be moved up and down relative to said barrel.

3. The device according to claim 1 further comprising means for biasing said shaft away from said base and the punch.

4. A device for actuating a punch, the punch including a housing, a punch rod slidably received in the housing, said device comprising:

a base for supporting the punch, an arm including a first end having a barrel secured thereon, said arm including a second end for securing to said base, a shaft slidably received in said barrel, means for moving said shaft downward to actuate on the punch rod of the punch, and means for adjusting said second end of said arm relative to said base.

5. The device according to claim 4, wherein said adjusting means includes a seat secured on said base, said seat includes a bore formed therein for slidably receiving said second end of said arm, and means for latching said second end of said arm to said seat.

6. The device according to claim 5, wherein said seat includes at least one aperture laterally formed therein and communicating with said bore of said seat, said second end of said arm includes at least one orifice formed therein and aligned with said at least one aperture of said seat, said latching means includes a latch engaged through said at least one orifice of said second end of said arm and said at least one aperture of said seat for securing said arm to said seat.

7. The device according to claim 4 further comprising a magnetic plate secured on said base for attracting and securing the punch on said base.

\* \* \* \* \*